US011239777B2

(12) United States Patent
Morel et al.

(10) Patent No.: US 11,239,777 B2
(45) Date of Patent: Feb. 1, 2022

(54) CIRCUIT AND METHOD FOR FREQUENCY TUNING OF A VIBRATIONAL ENERGY HARVESTER

(71) Applicants: Commissariat à l'Energie Atomique et aux Energies Alternatives, Paris (FR); UNIVERSITE SAVOIE MONT BLANC, Chambery (FR)

(72) Inventors: Adrien Morel, Grenoble (FR); Adrien Badel, Chambery (FR); Gaël Pillonnet, Grenoble (FR)

(73) Assignees: Commissariat à l'Energie Atomique et aux Energies Alternatives, Paris (FR); Universite Savoie Mont Blanc, Chambrey (FR)

( * ) Notice: Subject to any disclaimer, the term of this patent is extended or adjusted under 35 U.S.C. 154(b) by 0 days.

(21) Appl. No.: 16/822,662

(22) Filed: Mar. 18, 2020

(65) Prior Publication Data

US 2020/0313584 A1    Oct. 1, 2020

(30) Foreign Application Priority Data

Mar. 26, 2019  (FR) ...................... 1903162

(51) Int. Cl.
  *H02P 9/00*  (2006.01)
  *F03G 7/08*  (2006.01)
  (Continued)

(52) U.S. Cl.
  CPC ................ *H02P 9/006* (2013.01); *F03G 7/08* (2013.01); *F16F 15/005* (2013.01); *H02K 35/00* (2013.01); *H02N 2/181* (2013.01)

(58) Field of Classification Search
  CPC .......... H02P 9/006; F03G 7/08; F16F 15/005; H02K 35/00; H02N 2/181
  See application file for complete search history.

(56) References Cited

U.S. PATENT DOCUMENTS

2013/0181689 A1* 7/2013 Ocalan ...................... F03G 7/08
  322/2 R
2014/0021828 A1* 1/2014 Despesse ............... H02N 2/188
  310/319

FOREIGN PATENT DOCUMENTS

FR    2970826 A1    7/2012
GB    2425160 A    10/2006
WO    2013109571 A1    7/2013

OTHER PUBLICATIONS

Preliminary Search Report for French Application No. 1903162 dated Dec. 19, 2019, 2 pages.

(Continued)

*Primary Examiner* — Sean Gugger

(74) *Attorney, Agent, or Firm* — Moreno IP Law LLC

(57) ABSTRACT

The present disclosure relates to a method of tuning an electric charge extraction circuit of a vibrational energy harvester having a mechanical resonator, the method comprising varying, during a first phase, first and second parameters ($\psi_1, \psi_2$) of the electric charge extraction circuit based on detected harvested power ($P_{HARVEST}$), each of the first and second parameters ($\psi_1, \psi_2$) influencing the amount of damping of the mechanical resonator and at least the first parameter ($\psi_1$) influencing the resonance frequency of the mechanical resonator, wherein the first and second parameters ($\psi_1, \psi_2$) are varied during the first phase such that the amount of damping remains constant or varies by less than a first significant amount and the resonance frequency reaches a final level.

10 Claims, 9 Drawing Sheets

(51) Int. Cl.
*F16F 15/00* (2006.01)
*H02K 35/00* (2006.01)
*H02N 2/18* (2006.01)

(56) References Cited

OTHER PUBLICATIONS

A. Badel et al., "Wideband Piezoelectric Energy Harvester Tuned Through its Electronic Interface Circuit," J. Phys.: Conf. Ser. 557 (2014), 6 pages.

A. Brenes et al., "Experimental Validation of Wideband Piezoelectric Energy Harvesting Based On Frequency-Tuning Synchronized Charge Extraction," J. Phys.: Conf. Ser. 1052 (2018), 5 pages.

P. Hsieh et al., "Improving the Scavenged Power of Nonlinear Piezoelectric Energy Harvesting Interface at Off-Resonance by Introducing Switching Delay," IEEE Transactions on Power Electronics, vol. 30, Jun. 2015, 13 pages.

D. Mallick et al., "An Electrically Tunable Low Frequency Electromagnetic Energy Harvester," Procedia Engineering, vo. 87, 2014, pp. 771-774.

P. Mitcheson et al., "Tuning the Resonant Frequency and Damping of an Electromagnetic Energy Harvester Using Power Electronics," IEEE Transactions on Circuits and Systems II: Express Briefs, vol. 58, Dec. 2011, pp. 792-796.

U. Radhakrishna et al., "A low-power integrated power converter for an electromagnetic vibration energy harvester with 150 mV-AC cold startup, frequency tuning, and 50 Hz AC-to-DC conversion," 2018 IEEE Custom Integrated Circuits Conference (CICC), 2018, pp. 1-4.

A. Morel et al., "Frequency tuning of piezoelectric energy harvesters thanks to a short-circuit synchronous electric charge extraction," 2018 Smart Mater. Struct. accepted manuscript, 25 pages.

A. Morel et al., "Short Circuit Synchronous Electric Charge Extraction (SC-SECE) Strategy for Wideband Vibration Energy Harvesting," 2018 IEEE International Symposium on Circuits and Systems, 2018, 5 pages.

B. Ahmed-Seddik et al., "Self-powered resonant frequency tuning for Piezoelectric Vibration Energy Harvesters," J. Phys.: Conf. Ser. 476 (2014), 6 pages.

Y. Cai et al., "A Piezoelectric Energy Harvester Interface Circuit with Adaptive Conjugate Impedance Matching, Self-Startup and 71% Broader Bandwidth," ESSCIRC 2017: 43rd IEEE European Solid State Circuits Conference, 2017, pp. 119-122.

\* cited by examiner

CIRCUIT AND METHOD FOR FREQUENCY TUNING OF A VIBRATIONAL ENERGY HARVESTER

FIELD

The present disclosure relates to the field of energy recuperation, and in particular to a vibrational energy harvester for recuperating electrical energy from ambient vibrations.

BACKGROUND

Vibrational energy harvesters are a type of electrical generator that can be employed in a broad range of environments in order to extract energy from ambient vibrations. Such generators generally comprise a mechanical resonator, means for converting the movement of the resonator into electrical energy, and an electric charge extraction circuit for extracting the electrical energy. For example, such generators typically use a piezoelectric layer or an electromagnetic system to convert the mechanical oscillations of the resonator into electrical energy. The extracted electrical energy can for example be used to charge a battery, or otherwise provide electrical power to a load.

A difficulty with existing vibrational energy harvesters is that, in order to achieve reasonable levels of energy recuperation, the resonance frequency of the mechanical resonator should be equal to or close to the frequency of the ambient vibrations from which energy is to be extracted. However, even if such harvesters are manufactured to target a known frequency of ambient vibrations, any drift over time in the resonance frequency of the mechanical resonator or in the frequency of the ambient vibrations can lead to a significant reduction in performance.

It has been proposed to provide systems allowing the resonance frequency of a mechanical resonator to be tuned during use. However, there are technical difficulties in providing a tuning algorithm that achieves high levels of harvested power for a broad range of types of energy harvesters.

SUMMARY

According to one aspect, there is provided a method of timing an electric charge extraction circuit of a vibrational energy harvester having a mechanical resonator, the method comprising: varying, during a first phase, first and second parameters of the electric charge extraction circuit based on detected harvested power, each of the first and second parameters influencing the amount of damping of the mechanical resonator and at least the first parameter influencing the resonance frequency of the mechanical resonator, wherein the first and second parameters are varied during the first phase such that the amount of damping remains constant or varies by less than a first significant amount and the resonance frequency reaches a final level.

According to one embodiment, the method further comprises: varying, during a second phase, at least the second parameter based on detected harvested power such that the resonance frequency remains at the final level, or varies with respect to the final level by less than a second significant amount, and the amount of damping reaches a final level.

According to one embodiment, both the first and second parameters influence the resonance frequency, and both of the first and second parameters are varied during the second phase.

According to one embodiment, varying the first and second parameters during the first phase is based on a feedback signal indicating the harvested power.

According to one embodiment, the first parameter may only have one of N discrete levels, and the second parameter may only have one of M discrete levels, N and M being integers each equal to at least four.

According to one embodiment, the final level of the resonance frequency corresponds to a level resulting in a highest amount of harvested power among all combinations of the levels of the first and second parameters during the first phase while the amount of damping varies by less than the first significant amount.

According to one embodiment, the final level of the amount of damping corresponds to a level resulting in a highest amount of harvested power among all combinations of levels of the first and second parameters during the second phase while the resonance frequency varies by less than the second significant amount with respect to its final level.

According to one embodiment, the first significant amount corresponds to the smallest variation possible in view of the discrete levels of the first and second parameters.

According to one embodiment, the second significant amount corresponds to the smallest variation possible in view of the discrete levels of the first and second parameters.

According to one embodiment, the vibrational energy harvester comprises a mechanical resonator having a piezoelectric layer.

According to a further aspect, there is provided a tuning circuit for tuning an electric charge extraction circuit of a vibrational energy harvester having a mechanical resonator, the tuning circuit being configured to: vary, during a first phase, first and second parameters of the electric charge extraction circuit based on detected harvested power, each of the first and second parameters influencing the amount of damping of the mechanical, resonator and at least the first parameter influencing the resonance frequency of the mechanical resonator, wherein the tuning circuit is configured to vary the first and second parameters during the first phase such that the amount of damping remains constant or varies by less than a first significant amount and the resonance frequency reaches a final level.

According to one embodiment the tuning circuit is further configured to vary, during a second phase, at least the second parameter based on the detected harvested power such that the resonance frequency remains constant or varies with respect to the final level by less than a second significant amount and the amount of damping reaches a final level.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

In the following disclosure, unless indicated otherwise, when reference is made to absolute positional qualifiers, such as the terms "trout", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to an energy harvester as orientated during normal use.

Unless specified otherwise, the expressions "around", "approximately", "substantially" and "in the order of" signify within 10%, and preferably within 5%.

In the following description, embodiments are described in relation with a vibrational energy harvester based on piezoelectric energy recuperation. However, it will be readily apparent to those skilled in the art that the principles described herein could be applied to other types of vibrational energy harvesters in which energy is extracted from a mechanical resonator, such as those based on electromagnetic energy recuperation.

Figure 1:
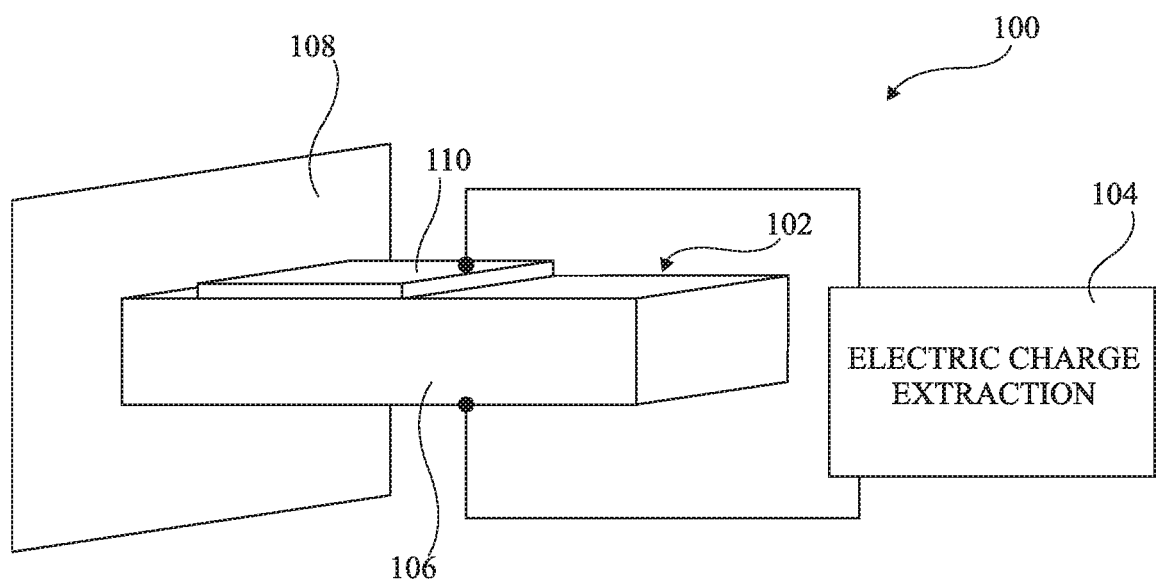
FIG. 1 schematically illustrates a vibrational energy harvester according to an example embodiment.

FIG. 1 schematically illustrates a vibrational energy harvester 100 comprising a mechanical resonator 102 and an electric charge extraction circuit (ELECTRIC CHARGE EXTRACTION) 104 for harvesting electrical energy from the mechanical resonator 102.

The mechanical resonator 102 for example comprises a beam 106 adapted to resonate mechanically. In the example of FIG. 1, the beam 106 has one end attached to a support surface 108, although in alternative embodiments other arrangements would be possible. The resonator 102 further comprises a layer 110 of piezoelectric material coupled to the circuit 104. A ground plane of the beam 106 is also for example coupled to the circuit 104.

When the vibrational energy harvester 100 is placed in an environment having a source of vibrations, energy can be harvested. In particular, the electric charge extraction circuit 104 is capable of extracting; electrical energy from the piezoelectric layer 110 during oscillations of the mechanical resonator 102. As described in more detail below, the operation of charge extraction by the circuit 104 impacts the oscillations of the mechanical resonator 102, modifying its resonance frequency and/or causing a certain extent of damping.

The vibrational energy harvester 100 of FIG. 1 could have many applications, such as in a pacemaker, mounted on industrial machines, such as those of a production chain, in sporting equipment, such as mounted in the soles of running shoes or in a backpack, or in automotive or aeronautic applications, such as mounted on the engine of a motor vehicle or on the fuselage of an airplane.

Figure 2:
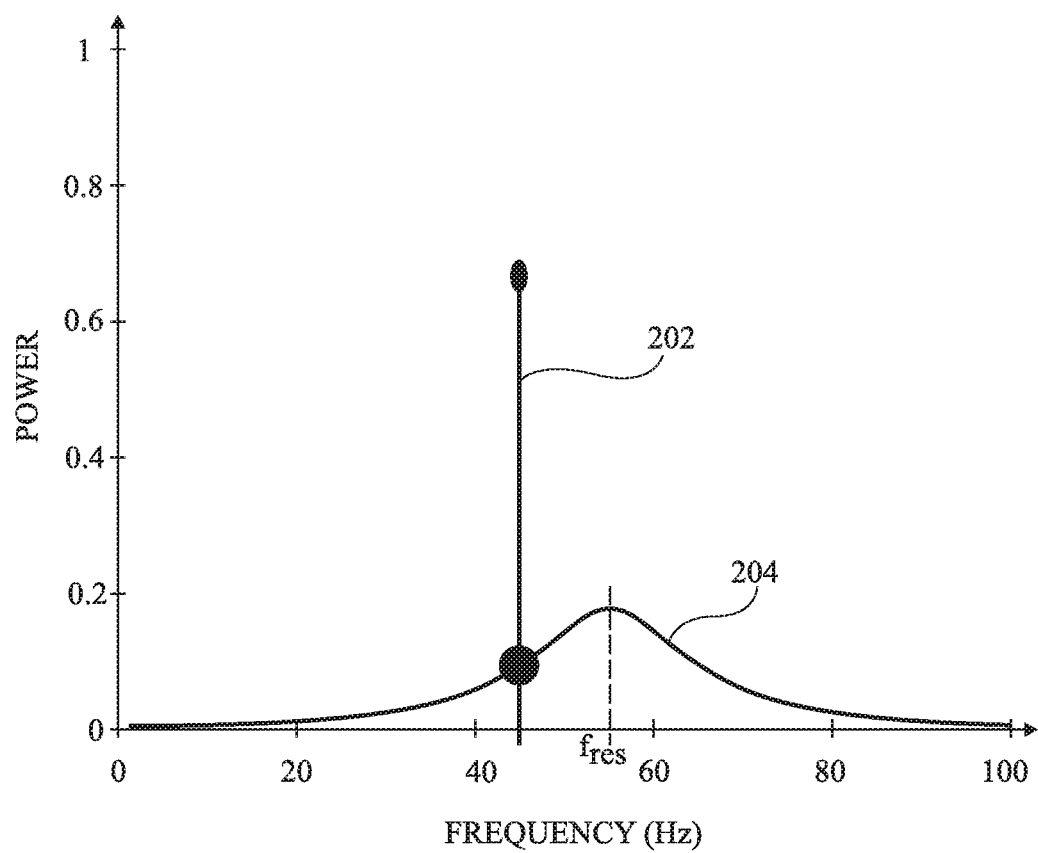
FIG. 2 is a graph representing a power frequency response of the energy harvester of FIG. 1 according to an example embodiment.

FIG. 2 is a graph representing an example of the power frequency response of the vibrational energy harvester 100 of FIG. 1. In the example of FIG. 2, a spike 202 represents ambient vibrations, which are for example at a frequency of 43 Hz. A curve 204 represents the power frequency response, which is in the form of a bell curve centered on the resonance frequency $f_{res}$ of the mechanical resonator 102, which in this example is at 56 Hz. The frequency difference between the resonance frequency $f_{res}$ and the frequency of the ambient vibrations leads to very inefficient energy extraction, corresponding for example to only a level of 0.1, where 1 represents the total available energy. Furthermore, the power frequency response is significantly damped, peaking at only around the level of 0.2.

Mechanical resonators such as the one of FIG. 1 can be designed to have a resonance frequency close to a known frequency of the ambient vibrations from which energy is to be harvested. However, a difficulty is that any difference between the frequency of the vibrations and the resonance frequency of the mechanical resonator will cause a considerable drop in the displacement amplitude of the resonator and thus also in the power that can be recuperated. Such a difference can have many different origins, including:

imprecise conception of the mechanical resonator;
variations in the frequency of the ambient vibrations;
aging of the mechanical resonator, leading for example to a modification of the stiffness of the beam 106;
variations in the ambient acceleration to which the energy harvester is subjected, for example in the case that the harvester is mounted in a moving environment, such as in an airplane or motor vehicle; and
variations in the ambient temperature, modifying properties of the beam and/or of the piezoelectric layer 110, and thus modifying the resonance frequency.

To correct such frequency differences, a solution is to provide a tuning circuit for tuning the electric charge extraction circuit 104, and thus the resonance frequency of the mechanical resonator, during its lifetime. There is however a technical difficulty in providing a system capable of timing the circuit 104 to provide relatively high levels of harvested energy, as will now be described in more detail with reference to FIGS. 3 to 6.

Figure 3:
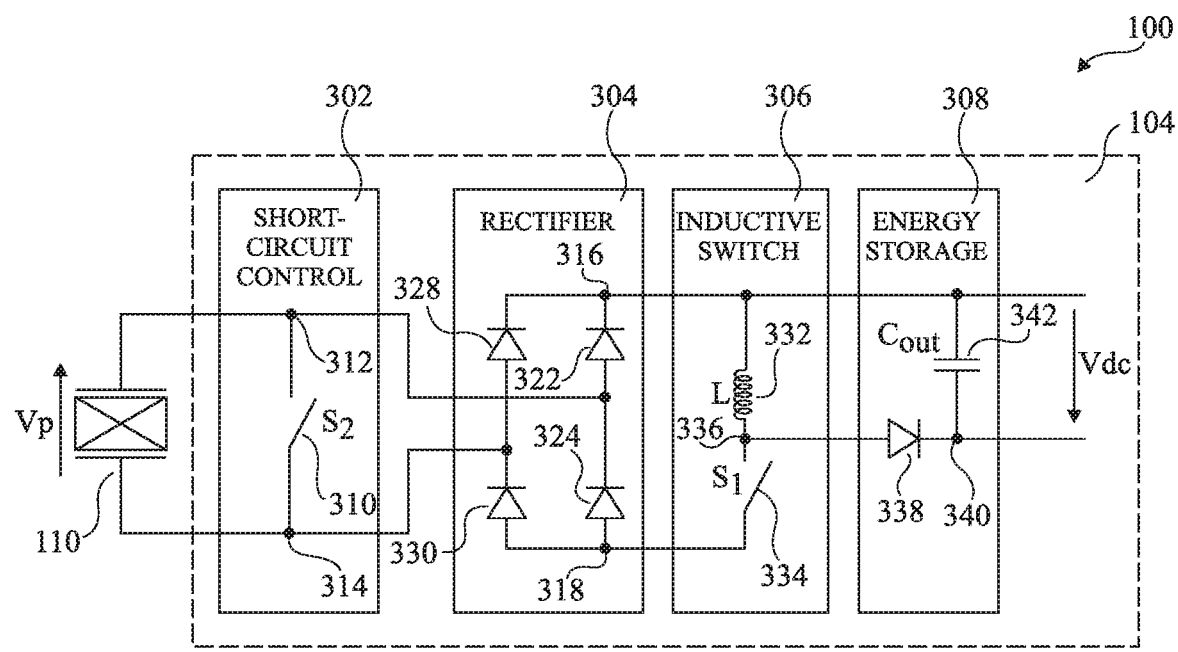
FIG. 3 schematically illustrates the vibrational energy harvester of FIG. 1, including an electrical interface shown in more detail, according to an example embodiment.

FIG. 3 schematically illustrates the energy harvester 100 of FIG. 1, and in particular the electric charge extraction circuit 104, in more detail according to one example. In the example of FIG. 3, the circuit 104 comprises, coupled to the piezoelectric layer 110 of the resonator 102 (not illustrated in FIG. 3), a short-circuit control circuit (SHORT-CIRCUIT CONTROL) 302, a rectifier (RECTIFIER) 304, an inductive switch (INDUCTIVE SWITCH) 306, and an energy storage circuit (ENERGY STORAGE) 308.

The short-circuit control circuit 302 comprises a switch 310 coupled between terminals 312, 314 of the piezoelectric layer 110, across which there is a voltage $V_p$. The switch 310 is controlled by a control signal $S_2$.

The rectifier 304 for example comprises an AC/DC diode bridge coupling the terminals 312, 314 to output terminals 316, 318 of the rectifier 304. The diode bridge for example comprises a diode 322 having its anode coupled to the terminal 312, and its cathode coupled to the output terminal 316, a diode 324 having its anode coupled to the output terminal 318, and its cathode coupled to the terminal 312, a diode 328 having its anode coupled to the terminal 314 and its cathode coupled to the output terminal 316, and a diode 330 having its anode coupled to the output terminal 318 and its cathode coupled to the terminal 314.

The inductive switch 306 for example comprises an inductor 332 of inductance L and a switch 334 coupled in series between the output terminals 316, 318 of the rectifier 304. The switch 334 is for example controlled by a signal $S_1$.

The energy storage circuit 308 is for example coupled to the output terminal 316 of the rectifier 304 and to an intermediate node 336 of the inductive switch 306 between the inductor 332 and the switch 334. The energy storage circuit 308 comprises a diode 338 having its anode coupled to the intermediate node 336 and its cathode coupled to a node 340. A capacitor 342 of capacitance $C_{out}$ is coupled between the node 340 and the terminal 316. There is a DC voltage $V_{dc}$ across the capacitor 342.

In order to obtain relatively high energy recuperation from the mechanical resonator 102, the present inventors have found that the following two conditions should be met: the resonance frequency $f_{res}$ of the mechanical resonator should be equal to or within 2 percent of the frequency of the ambient vibrations;
the damping introduced by the electrical control system, which will be referred to herein as electrically induced damping $\xi_e$, should be equal to or within 2 percent of the mechanical damping within the resonator.

In order to permit these two conditions to be met, the electric, charge extraction circuit 104 can be configured to have two parameters that each influence the resonance frequency $f_{res}$ and/or the electrically induced damping $\xi_e$.

For example, in the electric charge extraction circuit 104 of FIG. 3, these parameters will be called ($\phi_1$, $\phi_2$). The parameter $\phi_1$ is for example the phase between the harvesting event and the mechanical displacement extremum, which is controlled by the signal $S_1$. The parameter $\phi_2$ is for example the duration of the phase during which the piezoelectric layer 110 is short-circuited, as will now be described in more detail with reference to FIG. 4.

Figure 4:
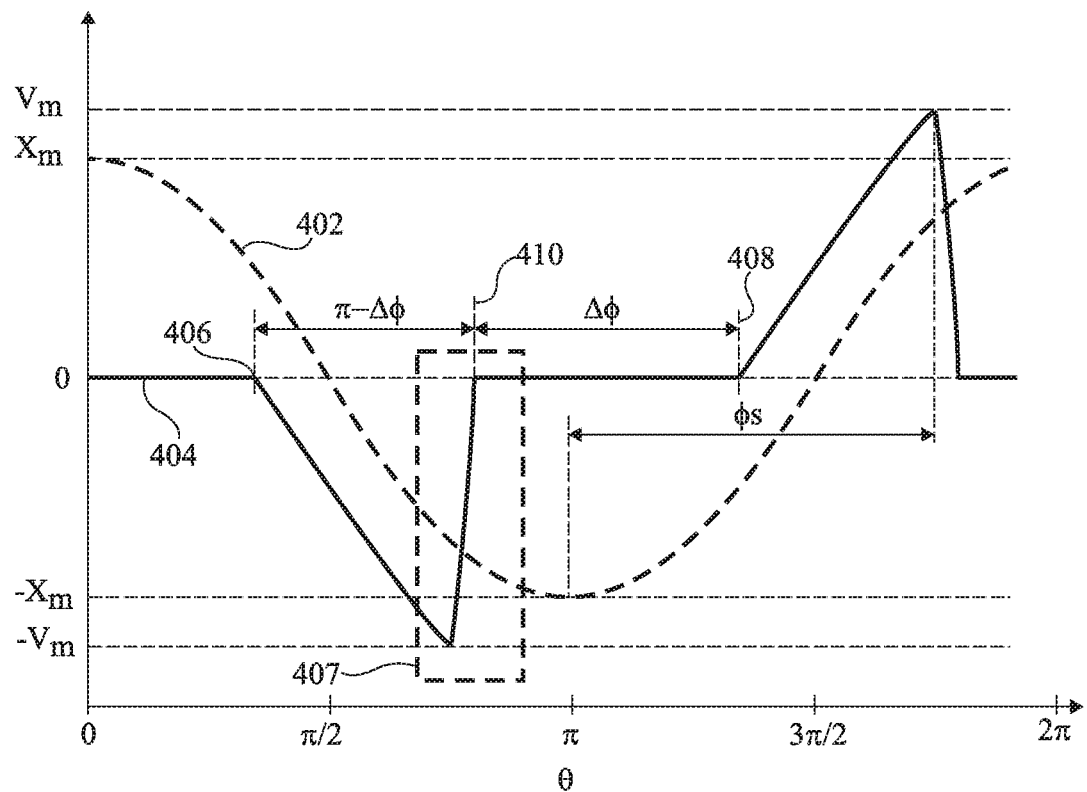
FIG. 4 is a graph representing signals in the system of FIG. 3 according to an example embodiment.

FIG. 4 is a graph representing, by a dashed curve 402, the displacement of the mechanical resonator 102 between peak displacements $X_m$ and $-X_m$, and, by a solid curve 404, the voltage $V_p$ across the piezoelectric layer 110, during an oscillation period of $2\pi$ radians.

The oscillation period starts at the peak displacement $X_m$ of the resonator, and the signal $S_2$ is initially asserted controlling the switch 310 to short-circuit the terminals 312, 314 of the mechanical resonator 102. At a point 406, the signal $S_2$ is deactivated for a duration $\pi-\Delta\phi$ such that the voltage $V_p$ falls negative until this voltage reaches a level of $-V_m$, at which point the signal. $S_2$ is activated again to trigger an energy harvesting event 407 and bring the voltage back to 0, where it stays for a duration $\Delta\phi$. At a point 408, the signal $S_2$ is again deactivated, allowing the voltage $V_p$ to rise to the peak $V_m$, at which point the signal $S_2$ is activated again. The parameter $\phi_2$ for example corresponds to the duration $\Delta\phi$. The parameter $\phi_1$ for example corresponds to a phase lag $\phi s$ in FIG. 4 between the tune instant of the maximum negative displacement $-X_m$ and the time instant of the peak voltage $V_m$.

While in the example of FIG. 3 both of the parameters ($\phi_1,\phi_2$) influence both the resonance frequency $f_{res}$ and the electrically induced damping $\xi_e$, in some cases only one of the parameters may have an influence on the resonance frequency.

The challenge is to determine, during a tuning phase of the electric charge extraction circuit of an energy harvester, the combination of parameter values for the parameters $\phi_1$ and $\phi_2$ that permit a relatively high, or the highest possible, amount of energy recuperation.

One approach for determining these parameters is to apply a gradient algorithm based on a measurement of harvested power, as will now be described with reference to FIGS. 5 and 6.

Figure 5:
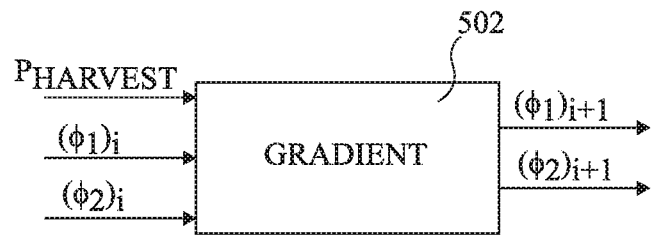
FIG. 5 schematically illustrates an example of a gradient algorithm for determining two parameters of an electric charge extraction circuit of FIG. 3.

FIG. 5 schematically illustrates an example of a gradient algorithm computation device (GRADIENT) 502 for determining the two parameters $\phi_1$ and $\phi_2$ that lead to the highest harvested power. The circuit 502 for example receives previous values $(\phi_1)_i$ and $(\phi_2)_i$ of the parameters $\phi_1$ and $\phi_2$, and a measurement $P_{HARVEST}$ of the harvested power, and generates new parameters $(\phi_1)_{i+1}$ and $(\phi_2)_{i+1}$ based on these inputs. For example, the algorithm involves comparing the power harvested using parameter values ($\phi_1$, $\phi_2$) with the power harvested using modified parameter values ($\phi_1+\Delta\phi_1$, $\phi_2+\Delta\phi_2$). If the power has increased, the algorithm continues to modify the parameters in the same direction. If the power decreases, the algorithm modifies the direction of change of either or both of the parameters, the modifications generally being applied to one parameter at a time.

An advantage of such a gradient algorithm is that tuning is performed that is independent of the particular excitation conditions. However, it is possible that such an algorithm fails to identify the best combination of parameters, as in most cases the function linking the harvested power to the parameters is not a convex function, as will now be explained with reference to FIG. 6.

Figure 6:
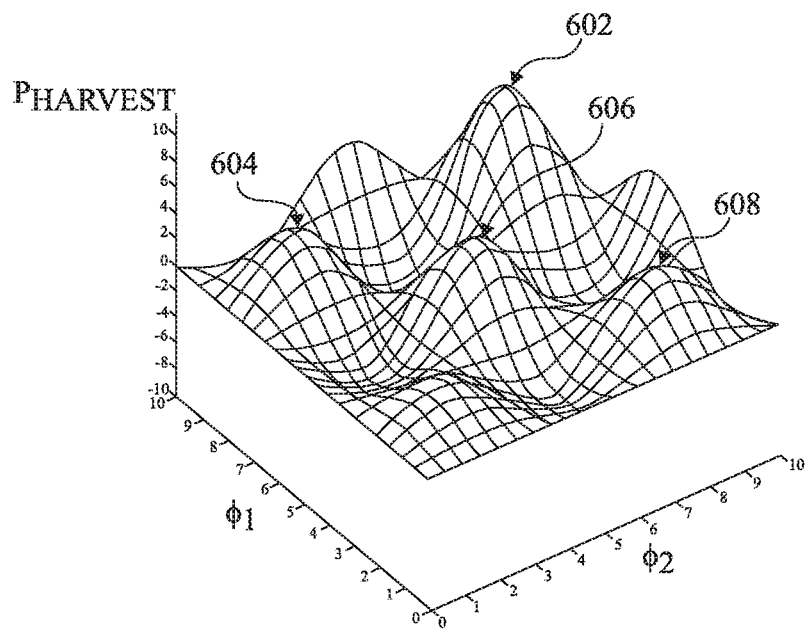
FIG. 6 is a graph illustrating an example of harvested power as a function of the two parameters of the electric charge extraction circuit of FIG. 3.

FIG. 6 is a 3-dimensional graph illustrating an example of harvested power $P_{HARVEST}$ as a function of the two parameters ($\phi_1$, $\phi_2$). A global maximum of the harvested power is labelled 602 in FIG. 6. There are also local maxima labelled 604, 606 and 608. The gradient algorithm risks remaining stuck on one of the local maxima 604, 606 and 608, and thus never reaching the global maxima 602. This can lead to relatively poor levels of harvested energy, as the resonance frequency $f_{res}$ and the electrically induced damping are likely to be far from optimal.

Figure 7:
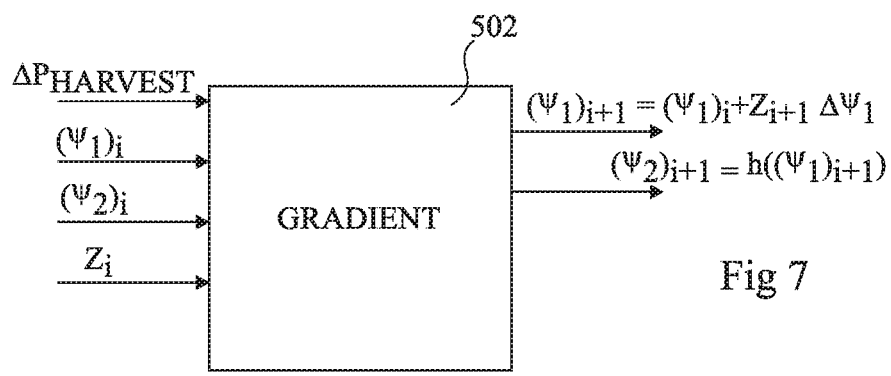
FIG. 7 schematically illustrates a gradient algorithm for determining two parameters of an electric charge extraction circuit according to an example embodiment of the present disclosure.

FIG. 7 schematically illustrates a gradient algorithm computation device 502 for determining the values of two parameters of an electric charge extraction circuit that maximize, or at least result in relatively high, harvested power according to an example embodiment of the present disclosure. Generally these parameters each have a discrete set of possible values, and thus maximizing harvested power for example implies determining the combination of parameter values among each discrete set that results in the highest level of harvested power. The algorithm implemented by the device 702 is for example a type of Maximum Power Point Tracking (MPPT) algorithm, such algorithms tracking conditions of the system in order to extract relatively high power from an energy source.

In FIG. 7, the two parameters used to control the electric charge extraction circuit are designated $\psi_1$ and $\psi_2$. The algorithm for example receives as inputs the previously applied parameters $(\psi_1)_i$ and $(\psi_2)_i$, the difference $\Delta P_{HARVESTi}=P_{HARVESTi}-P_{HARVESTi-1}$ between the power measured during application of the parameters $(\psi_1)_i$ and $(\psi_2)_i$ and the application of the previous parameters $(\psi_1)_{i-1}$ and $(\psi_2)_{i-1}$, and a parameter $z_i$ having a value of either 1 or −1. The sign of the parameter z, which will be designated herein as sgn(z), is for example defined as follows:

$$\text{sgn}(z)_{i+1}=\text{sgn}(z)_i \text{ if } P_{HARVESTi}>P_{HARVESTi-1} \quad [\text{Eq. 1}]$$

$$\text{sgn}(z)_{i+1}=-\text{sgn}(z)_i \text{ if } P_{HARVESTi}<P_{HARVESTi-i} \quad [\text{Eq. 2}]$$

The gradient algorithm computation device 702 generates, in some embodiments, new values $(\psi_1)_{i+1}$ and $(\psi_2)_{i+1}$ of the parameters based on the following formulas:

$$(\psi_1)_{i+1}=(\psi_1)_i+z_{i+1}\Delta\psi_1 \quad [\text{Eq. 3}]$$

$$(\psi_2)_{i+1}=h((\psi_1)_{i+1}) \quad [\text{Eq. 4}]$$

where $\Delta\phi_1$ is for example a standard increment of the parameter $\psi_1$ and h( ) is a function described in more detail below. Operation of the gradient algorithm computation device 702 will now be described in more detail with reference to FIG. 8.

Figure 8:
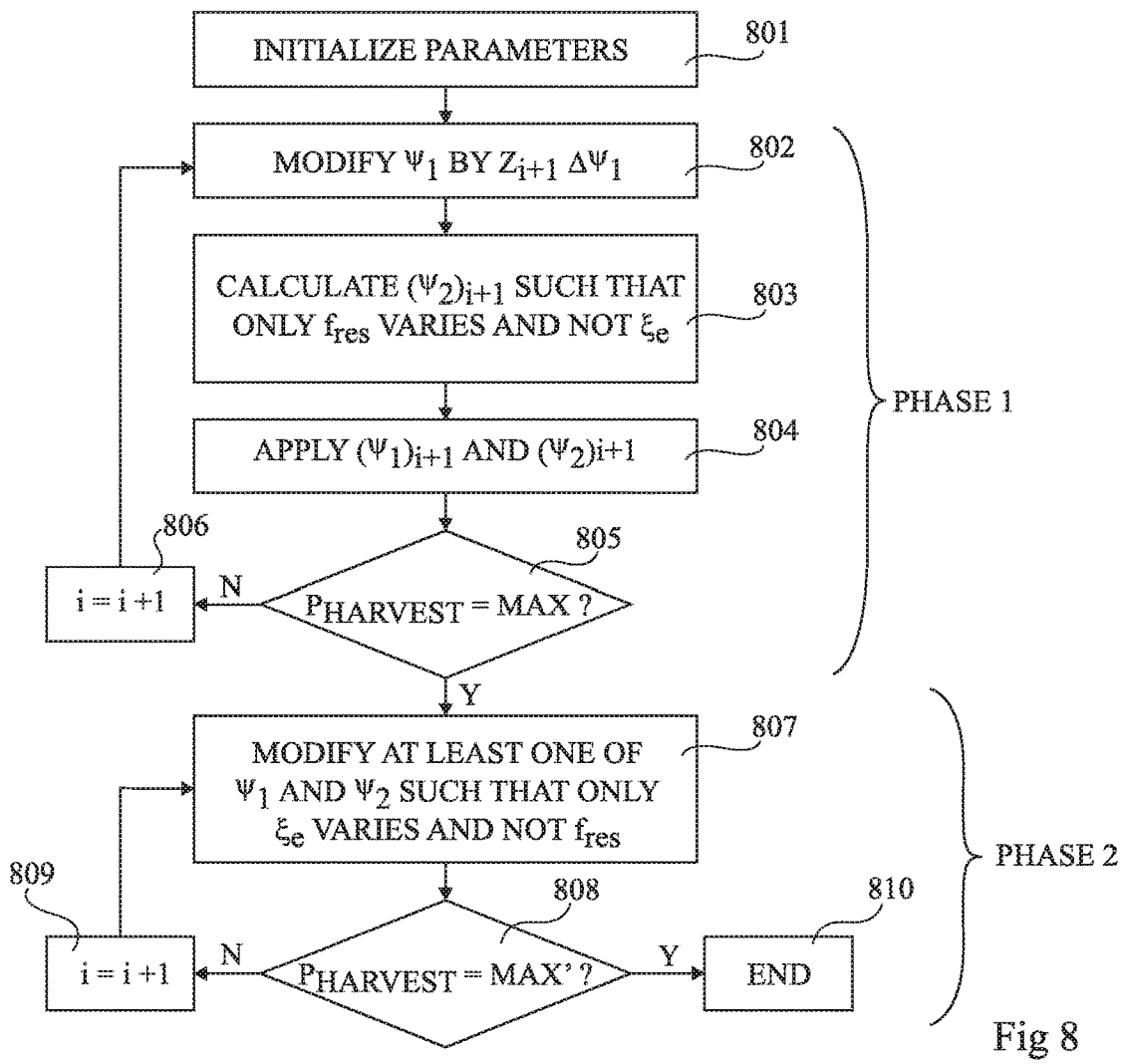
FIG. 8 is a flow diagram illustrating operations in a method of tuning an electric charge extraction circuit according to an example embodiment of the present disclosure.

FIG. 8 is a flow diagram illustrating operations in a method of calibrating an electric charge extraction circuit, such as the circuit 104 of FIG. 3, according to an example embodiment of the present disclosure.

A first phase PHASE 1 of the method involves operations 801 to 806.

In the operation 801, the parameters $f_{res}$ and $\xi_e$ are initialized to initial values $(f_{res\_init}, \xi_{e\_init})$ by initializing the parameters $\psi_1$ and $\psi_2$ at initial values $(\psi_{1\_init}, \psi_{2\_init})$. While the parameter $f_{res}$ is for example initialized at any value within the range selectable using the parameters $\psi_1$ and $\psi_2$, the parameter $\xi_e$ is for example initialized based on the particular application, the desired precision and/or the desired speed of convergence. Indeed, a relatively high value of $\xi_{e\_init}$ will lead to a rapid convergence of the algorithm, but relatively low precision. A relatively low value of $\xi_{e\_init}$ will lead to a relatively high precision, but slow convergence. In some embodiments, choosing an intermediate value of $\xi_{e\_init}$ provides a good compromise between precision and speed.

The initial values $(\psi_{1\_init}, \psi_{2\_init})$ of the parameters are then for example applied to the electric charge extraction circuit, and the corresponding harvested power is for example measured.

In the operation 802, a new parameter value $(\psi_1)_{i+1}$ is for example generated by adding or subtracting from the previous value $(\psi_1)_i$ the increment $\Delta\psi_1$ based on the sign of the parameter $z_{i+1}$. Initially, when only the initial power measurement $P_{HARVESTi}$ is available, the parameter $z_{i+1}$ is for example set to 1.

In the operation 803, a new parameter value $(\psi_2)_{i+1}$ is for example generated such that the combination of parameters $((\psi_1)_{i-1},(\psi_2)_{i+1})$ results in only the resonance frequency $f_{res}$ of the mechanical resonator varying, while the amount of electrically induced damping $\xi_e$ remains relatively constant, and for example varies by less than a significant amount. This is for example achieved by applying a function $h_{11}( )$ to the new parameter value $(\psi_1)_{i+1}$. The function $h_{11}( )$ is for example determined based on a function $k_1$ that defines the amount of electrically induced damping $\xi_e$ as a function of the parameters $\psi_1$ and $\psi_2$, and in particular $\xi_e=k_1(\psi_1,\psi_2)$. This relation is generally known for a given energy harvester, or can be deduced. The function $h_{11}( )$ is for example chosen such that:

$$\forall \psi_1, \frac{\delta k_1(\psi_1, h_{11}(\psi_1))}{\delta\psi_1} = 0 \quad [\text{Eq. 5}]$$

In other words, the function $h_{11}( )$ is chosen in order to generate a value of the parameter $\psi_2$ that results in no change, or insignificant change, to the amount of electrically induced damping $\xi_e$ for a given change to the parameter $\psi_1$. In some embodiments, the values of the parameter $\psi_2$ for given new values of the parameter $\psi_1$ are calculated in advance, and stored for example in a lookup table of the gradient algorithm computation device 702. Alternatively, the device 702 may store and apply the function $h_{11}( )$ for each new value of the parameter $\psi_1$.

While in some embodiments the parameter $\psi_2$ is chosen such that the amount of electrically induced damping $\xi_e$ remains constant, in practice the parameters $\psi_1$ and $\psi_2$ are for example chosen from a set of discrete values, and as such the amount of electrically induced damping $\xi_e$ may not be maintained exactly constant. For example, the parameter $\psi_1$ may only have a value selected from a set of N discrete values, and the parameter $\psi_2$ may only have a values selected from a set of M discrete values, where N and M are integers each equal to at least four. In some embodiments, the parameters $\psi_1$ and $\psi_2$ are represented by between 5 and 8 bits, implying that N and M are equal to between 32 and 256.

The significant amount for example corresponds to the smallest variations possible in view of the sets of discrete values of each of the first and second parameters $(\psi_1, \psi_2)$.

The operations 802 and 803 of FIG. 8 provide an example in which the parameter $\psi_1$ is modified first, and then the new value of the parameter $\psi_2$ is determined in order to maintain the electrically induced damping relatively constant. However, depending on the application, in alternative embodiments, the parameter $\psi_2$ is modified first, and then a new value of the parameter $\psi_1$ is determined in order to maintain the electrically induced damping relatively constant. For example, this is achieved by applying a function $h_{21}(\ )$ to the new parameter value $(\psi_2)_{i+1}$. The function $h_{21}(\ )$ is for example chosen such that:

$$\forall \psi_2, \frac{\delta k_1(h_{21}(\psi_2), \psi_2)}{\delta \psi_2} = 0 \qquad [\text{Eq. 6}]$$

In other words, the function $h_{21}(\ )$ is chosen in order to generate a value of the parameter $\psi_1$ that results in no change, or insignificant change, to the amount of electrically induced damping $\xi_e$ for a given change to the parameter $\psi_2$.

The choice between varying first the parameter $\psi_1$ or the parameter $\psi_2$ is for example based on which of these parameters permits the largest range of frequencies of the resonance frequency $f_{res}$.

In the operation 804, the new values $(\psi_1)_{i+1}$ and $(\psi_2)_{i+1}$ of the parameters are applied to the electric charge extraction circuit, and the harvested power is for example measured. The difference between this harvested power and the previous harvested power is for example determined by calculating $P_{HARVESTi} - P_{HARVESTi-1}$.

In the operation 805, it is determined whether a maximum power MAX has been achieved for the given amount of electrically induced damping $\xi_e$, in other words whether a peak power has been detected. Indeed, an advantage of varying only the parameter $f_{res}$ during the first phase PHASE 1 while the parameter $\xi_e$ remains relatively constant is that there is only one power maximum to be reached. This power maximum is for example considered to be reached when the detected harvested power oscillates around a certain peak value. For example, this state can be identified when the power increases during one or more changes of the parameters $\psi_1$, $\psi_2$ in a one direction, and then a subsequent change of the parameters $\psi_1$, $\psi_2$ in the same direction causes a drop in the harvested power. The parameter values $(\psi_1)_{i-1}$ and $(\psi_2)_{i-1}$ can then be considered to correspond to maximum harvested power. Furthermore, the resonance frequency $f_{res}$ corresponding to these parameters can be considered to be closest to the frequency of the ambient vibrations from which energy is to be harvested.

If in operation 805 it is determined that the maximum power MAX has not yet been reached, the variable i is for example incremented in operation 806, and then the first phase PHASE 1 is for example repeated based on a new calculation of the parameter z.

Once the maximum harvested power MAX has been reached in operation 805, the method may stop, if for example it is considered that only the resonance frequency is to be tuned. However, in order to also tune the amount of electrically induced damping, a second phase PHASE 2 of the method is implemented, involving operations 807 to 810 as will now be described, In the operation 807, at least one of the parameters $\psi_1$ and $\psi_2$ is modified such that the amount of electrically induced damping $\xi_e$ is varied, and the resonance frequency $f_{res}$ remains relatively constant, and for example varies by less than a significant amount.

In some embodiments, depending on the type of electric charge extraction circuit, only one of the parameters $\psi_1$ and $\psi_2$ influences the resonance frequency $f_{res}$ of the mechanical resonator. In such a case, in operation 807, only the parameter not influencing the resonance frequency $f_{res}$ is modified, thereby ensuring in a simple manner that the resonance frequency $f_{res}$ remains constant.

For other types of electric charge extraction circuits, both of the parameters $\psi_1$ and $\psi_2$ influence the resonance frequency $f_{res}$ of the mechanical resonator. For such circuits, in order to ensure that the resonance frequency $f_{res}$ remains constant or varies by less than a significant amount, both of the parameters $\psi_1$ and $\psi_2$ are for example modified using an approach similar to that of operations 802 and 803.

First, one of the parameters $\psi_1$, $\psi_2$ is modified. For example, the choice between modifying first the parameter $\psi_1$ or the parameter $\psi_2$ is based on which of these parameters permits the largest range of electrically induced damping to be applied. In the following it will initially be assumed that the parameter $\psi_1$ is modified first to a new value $(\psi_1)_{i+1}$.

The new value $(\psi_1)_{i+1}$ of the parameter $\psi_1$ is for example generated by adding or subtracting from the previous value $(\psi_1)_i$ the increment $\Delta\psi_1$ based on the sign of the parameter $z_{i+1}$. Initially, at the start of the phase PHASE 2 when only the power measurement $P_{HARVESTi}$ is available, the parameter $z_{i+1}$ is for example set to 1.

A new value $(\psi_2)_{i+1}$ of the parameter $\psi_2$ is then for example determined in order to maintain the resonance frequency relatively constant. This is for example achieved by applying a function $h_{12}(\ )$ to the new parameter value $(\psi_1)_{i+1}$. The function $h_{12}(\ )$ is for example determined based on a function $k_2$ that defines the resonance frequency $f_{res}$ as a function of the parameters $\psi_1$ and $\psi_2$, and in particular $f_{res} = k_2(\psi_1, \psi_2)$. This relation is generally known for a given energy harvester, or can be deduced. The function $h_{12}(\ )$ is for example chosen such that:

$$\forall \psi_1, \frac{\delta k_2(\psi_1, h_{12}(\psi_1))}{\delta \psi_1} = 0 \qquad [\text{Eq. 7}]$$

In other words, the function $h_{12}(\ )$ is chosen in order to generate a value of the parameter $\psi_2$ that results in no change, or a change of less than a significant amount, to the resonance frequency $f_{res}$ for a given change to the parameter $\psi_1$. In some embodiments, the values of the parameter $\psi_2$ for given new values of the parameter $\psi_1$ are calculated in advance, and stored for example in a lookup table of the gradient algorithm computation device 702. Alternatively, the circuit 702 may store and apply the function $h_{12}(\ )$ for each new value of the parameter $\psi_1$. Indeed, the value of the parameter $\psi_2$ can for example be determined without knowing the resonance frequency $f_{res}$ in advance, but by knowledge of the relations between the parameters $\psi_1$ and $\psi_2$ and the resonance frequency, which can be computed dynamically or chosen from pre-calculated values stored in a lookup table.

We will now consider the case in which the parameter $\psi_2$ is modified first, and then a new value of the parameter $\psi_1$ is determined in order to maintain the resonance frequency $f_{res}$ relatively constant. For example, this is achieved by applying a function $h_{22}(\ )$ to the new parameter value $(\psi_2)_{i+1}$. The function $h_{22}(\ )$ is for example chosen such that:

$$\forall \psi_2, \frac{\delta k_2(h_{22}(\psi_2), \psi_2)}{\delta \psi_2} = 0 \qquad [\text{Eq. 8}]$$

In other words, the function $h_{22}(\ )$ is chosen in order to generate a value of the parameter $\psi_1$ that results in no change, or a change of less than a significant amount, to the resonance frequency $f_{res}$ for a given change to the parameter $\psi_2$.

As before, the significant amount for example corresponds to the smallest variations possible in view of the sets of discrete values of each of the first and second parameters ($\psi_1,\psi_2$).

In an operation 808, It is then determined whether the global maximum power MAX' has been achieved, in other words whether a new peak power has been detected. Indeed, an advantage of varying only the parameter $\xi_e$ during the second phase PHASE 2 while the parameter $f_{res}$ remains relatively constant is that there is only one power maximum to be reached. This power maximum is considered to be obtained when the detected harvested power oscillates around a certain peak. For example, this state can be identified when the power increases during one or more changes of the parameters $\psi_1$, $\psi_2$ in a one direction, and then a subsequent change of the parameters $\psi_1$, $\psi_2$ in the same direction causes a drop in the harvested power. The parameter values $(\psi_1)_{i-1}$ and $(\psi_2)_{i-1}$ can then be considered to correspond to global maximum harvested power.

If in operation 808 it is determined that the global maximum power MAX' has not yet been reached, the variable i is for example incremented in an operation 809, and then the second phase PHASE 2 is for example repeated based on a new calculation of the parameter z.

Once the maximum harvested power MAX' has been reached in operation 808 the method for example ends at an operation 810. Alternatively, instead of ending, the algorithm returns to operation 807 or to operation 801 after a given time delay. According to yet a further alternative, the operations 808 and 810 are omitted, and the operations 807 and 809 are repeated in a continuous loop.

FIGS. 9 to 13 are graphs representing a power frequency response of the energy harvesting system during tuning according to the method of FIG. 8, assuming that the initial state was that of FIG. 2.

Figure 9:
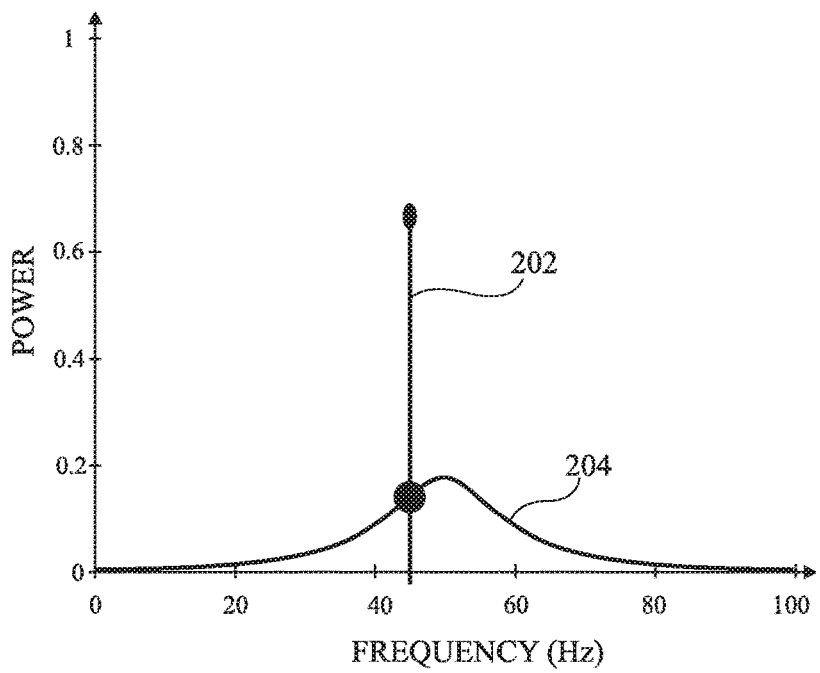
FIG. 9 is a graph representing a power frequency response of the energy harvester during a first phase of the method of FIG. 8.

FIG. 9 corresponds to an intermediate state during the first phase PHASE 1 of the algorithm after the power frequency response 204 has started to shift towards the frequency of the ambient vibrations 202.

Figure 10:
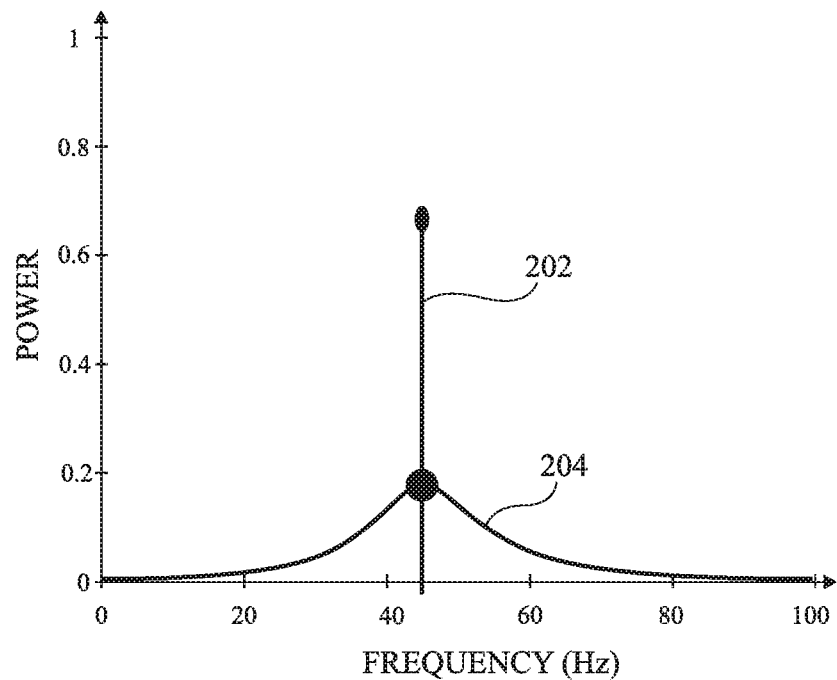
FIG. 10 is a graph representing a power frequency response of the energy harvester at the start of a second phase of the method of FIG. 8.

FIG. 10 corresponds to the end of the first phase PHASE 1 of the algorithm once the power frequency response 204 has become centered with respect to the frequency of the ambient vibrations 202.

Figure 11:
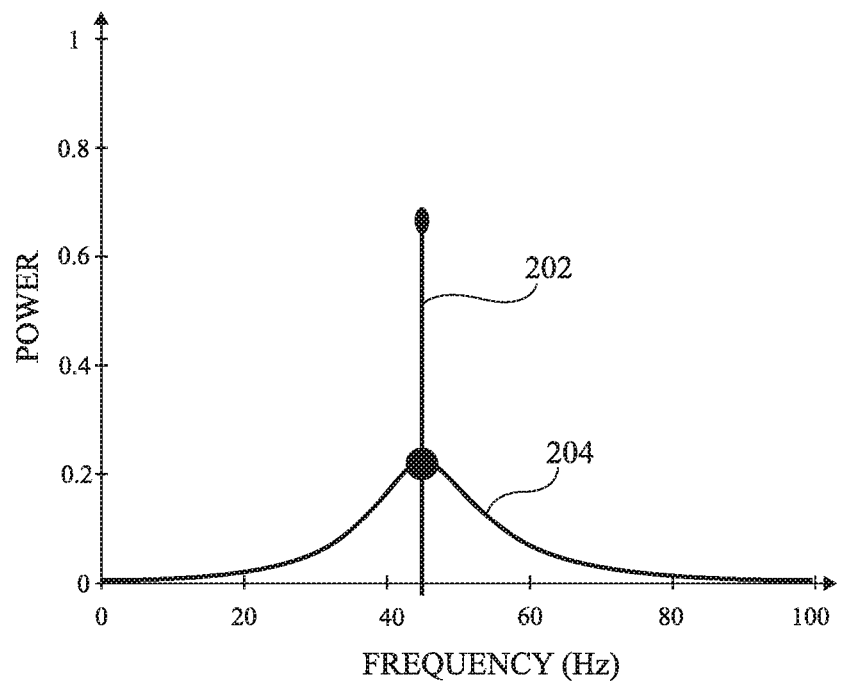
FIG. 11 is a graph representing a power frequency response of the energy harvester during the second phase of the method of FIG. 8.

FIG. 11 corresponds to an intermediate state during the second phase PHASE 2 of the algorithm after the electrically induced damping has been modified to increase the extracted power at the peak of the power frequency response 104.

Figure 12:
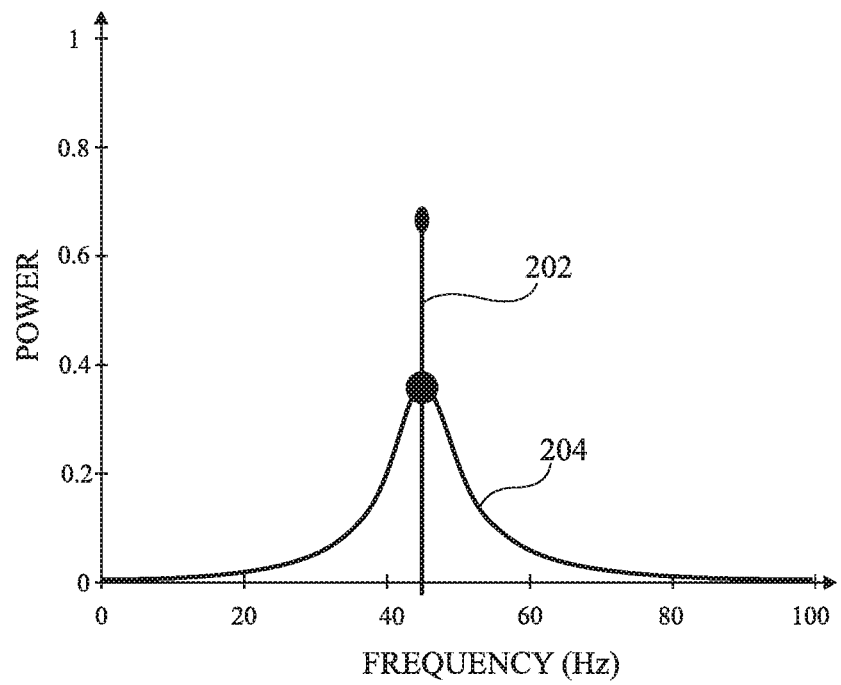
FIG. 12 is a graph representing a power frequency response of the energy harvester during the second phase of the method of FIG. 8.

FIG. 12 corresponds to a further intermediate state during the second phase PHASE 2 of the algorithm after the electrically induced damping has been modified to further increase the extracted power at the peak of the power frequency response 204.

Figure 13:
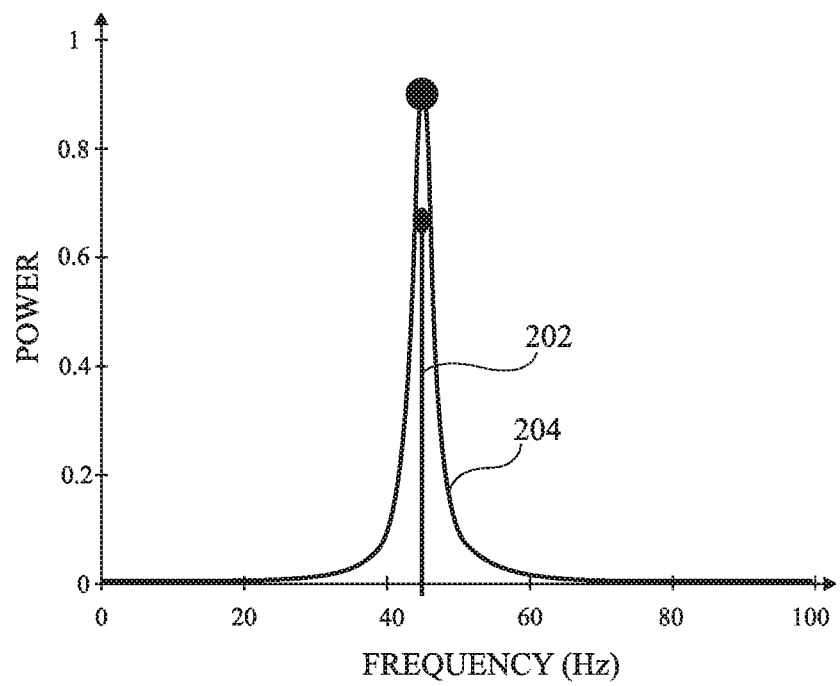
FIG. 13 is a graph representing a power frequency response of the energy harvester at a final stage of the second phase of the method of FIG. 8.

FIG. 13 corresponds to the final state of the algorithm, the power frequency response 204 having been tuned to be centered at the frequency of the ambient vibrations 202 and the amount of electrically induced damping having been tuned to permit a maximum level of power extraction for the given sets of available values for the parameters $\psi_1$ and $\psi_2$. The maximum level is for example equal in this example to around 90% of the available power.

Figure 14:
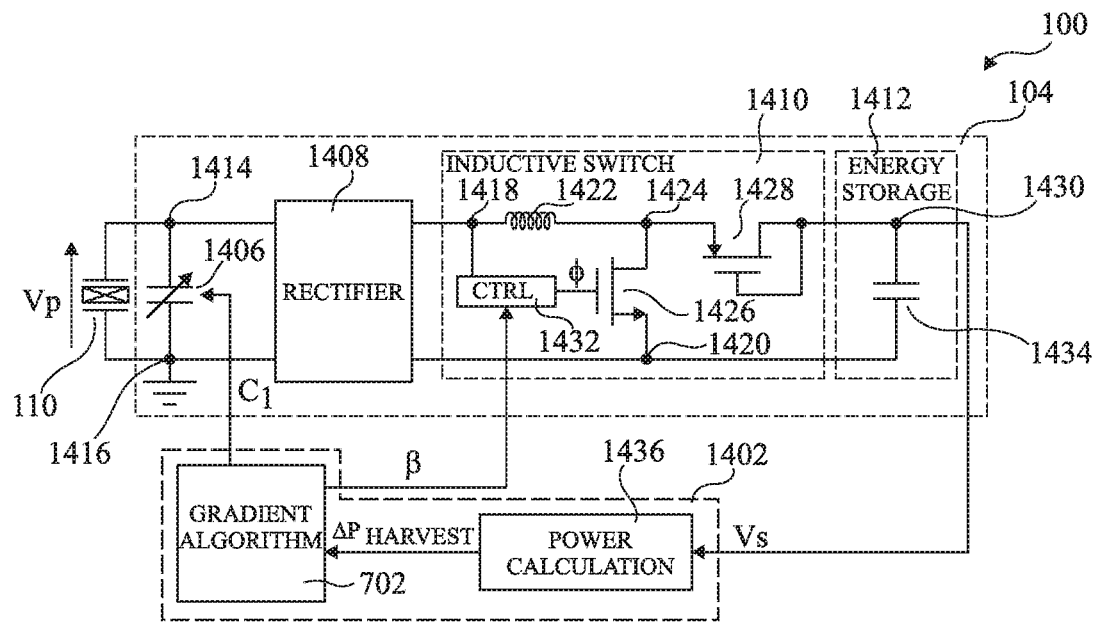
FIG. 14 schematically illustrates the energy harvester of FIG. 1 comprising a tuning circuit according to an example embodiment of the present disclosure.

FIG. 14 schematically illustrates the vibrational energy harvester 100 of FIG. 1 in more detail in the case that it incorporates a tuning circuit. In particular, the energy harvester 100 for example comprises the electric charge extraction circuit 104 for extracting charge from the piezoelectric layer 110 of the mechanical resonator 102, and a tuning circuit 1402 for tuning at least the resonance frequency $f_{res}$ and in some cases the amount of electrically induced damping $\xi_e$, of the electric charge extraction circuit 104.

In the example of FIG. 14, the electric charge extraction circuit 104 comprises a variable capacitor 1406, a rectifier (RECTIFIER) 1408, an inductive switch (INDUCTIVE SWITCH) 1410, and an energy storage circuit (ENERGY STORAGE) 1412.

The variable capacitor 1406 is coupled between terminals 1414, 1416 of the piezoelectric layer 110. The terminals 1414 and 1416 are also coupled to the rectifier 1408, Which has output terminals 1418, 1420 coupled to the inductive switch 1410. The inductive switch 1410 for example comprises an inductor 1422 coupled between the terminal 1418 and a node 1424, a transistor 1426, such as an NMOS transistor, coupled by its main conducting nodes between the node 1424 and the output terminal 1420 of the rectifier 1408, and a diode 1428, for example formed by a diode-connected PMOS transistor, coupling the node 1424 to an output terminal 1430 of the electric charge extraction circuit 104. The transistor 1426 is for example controlled by a timing signal $\phi$ generated by a control circuit (CTRL) 1432 based on the voltage at the output terminal 1418 of the rectifier 1408. The energy storage circuit 1412 for example comprises a capacitor 1434 coupled between the output terminal 1430 of the electric charge extraction circuit 104 and the output terminal 1420 of the rectifier 1408.

The tuning circuit 1402 for example comprises a power calculation circuit (POWER CALCULATION) 1436 generating the power difference $\Delta P_{HARVEST}$, and the gradient algorithm computation device (GRADIENT ALGORITHM) 702 of FIG. 7. In the embodiment of FIG. 14, the parameters $\psi_1, \psi_2$ correspond respectively to a parameter $C_1$ controlling the variable capacitor 1406, and a parameter $\beta$ providing an input to the control circuit 1432, these parameters being generated by the device 702.

Operation of the energy harvester 100 of FIG. 14 will now described in more detail with reference to FIG. 15 and the flow diagram of FIG. 8.

Figure 15:
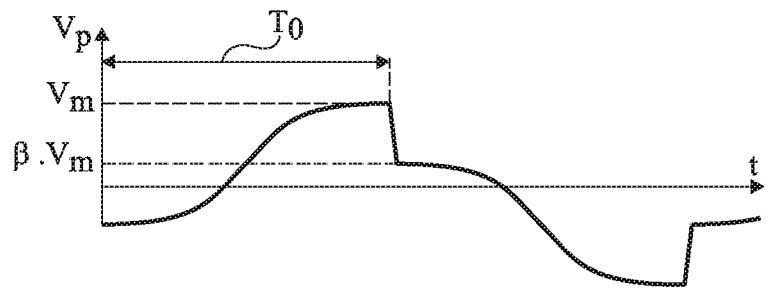
FIG. 15 is a graph showing an example of the voltage across a piezoelectric layer of the energy harvester of FIG. 14.

FIG. 15 is a graph showing an example of the voltage $V_p$ across the piezoelectric layer 110 of the energy harvester of FIG. 14. A period $T_0$ in FIG. 15 represents a semi-period of the vibration, in other words the time between the maximum displacements $-X_m$ and $X_m$.

When the voltage $V_p$ reaches a peak level $V_m$, the timing signal $\phi$ is asserted to activate the transistor 1426 and cause the voltage to fall by an amount depending on the parameter $\beta$, and for example to fall to a level $\beta \cdot V_m$. Increasing the parameter $C_1$ for example causes the voltage amplitude of the voltage $V_p$ to decrease, and changing $C_1$ for example modifies the phase between the mechanical displacement of the tip mass of the resonator and the input vibration.

The functions linking $(C_1,\beta)$ and $(f_{res},\xi_e)$ are for example as follows in the example of FIG. 14:

$$f_{res} = \frac{A}{(C_p + C_1)} \text{ and:} \qquad \text{[Eq. 9]}$$

$$\xi_e = \frac{B(1-\beta)}{(1+\beta)(C_p + C_1)} \qquad \text{[Eq. 10]}$$

where A and B are parameters depending on the particular piezoelectric energy harvester that used, and $C_p$ is the capacitance of the piezoelecnic layer 110.

With reference to the flow diagram of FIG. 8, in the operation 801, the parameters $C_1$ and $\beta$ are each initialized, for example at 0. In the operations 802 and 803, the frequency $f_{res}$ is modified by modifying both parameters $C_1$ and $\beta$. In the circuit of FIG. 14, only the signal $C_1$ influences the frequency $f_{res}$, and thus the function $h_{11}$ defined above is used in order to vary $f_{res}$ using $C_1$ and maintain the amount of electrically induced damping $\xi_e$ relatively constant using $\beta$.

The new value $\beta_{i+1}$ of the parameter $\beta$ as a function of the initial value $\xi_{ei}$ of the electrically induced damping can be determined as:

$$\beta_{i+1} = \frac{B - \xi_{e_i}(C_p + C_{1_{i+1}})}{B + \xi_{e_i}(C_p + C_{1_{i+1}})} \quad [\text{Eq. 11}]$$

Furthermore, we have the following equation for the initial value $\xi_{ei}$:

$$\xi_{e_i} = \frac{B(1 - \beta_i)}{(1 + \beta_i)(C_p + C_{1_i})} \quad [\text{Eq. 12}]$$

Combining these equations gives the following equation for the new value $\beta_{i+1}$ of the parameter $\beta$ that provides a constant value of $\xi_{ei}$:

$$\beta_{i+1} = \frac{(1+\beta_i)(C_{1_i}) - (1-\beta_i)(C_{1_{i+1}}) + 2\beta C_p}{(1+\beta_i)(C_{1_i}) + (1-\beta_i)(C_{1_{i+1}}) + 2C_p} \quad [\text{Eq. 13}]$$

In the operation 804 of FIG. 8, the parameters ($C_1$,$\beta$) are applied to the electric charge extraction circuit 104, and the power calculation circuit 1436 provides the power difference $\Delta P_{HARVEST}$ resulting from the new parameters. The operations 802, 803 and 804 are then repeated during the first phase PHASE 1 of the algorithm until the maximum power is reached in operation 805 for a final value $f_{res}'$ of the resonance frequency.

In the second phase PHASE 2, in the operation 807, the signal $\beta$ is modified in order to adjust the amount of electrically induced damping $\xi_e$. Given that the resonance frequency $f_{res}$ is not dependent on the parameter $\beta$, but only on the parameter $C_1$, the parameter $C_1$ is for example simply maintained at the final value during the second phase PHASE 2 in order to maintain the resonance frequency constant at the frequency $f_{res}'$. The power calculation circuit 1436 provides the power difference $\Delta P_{HARVEST}$ resulting from each new parameter $\beta_i$, and when the maximum power MAX' is detected as described above, the algorithm for example ends.

Figure 16:
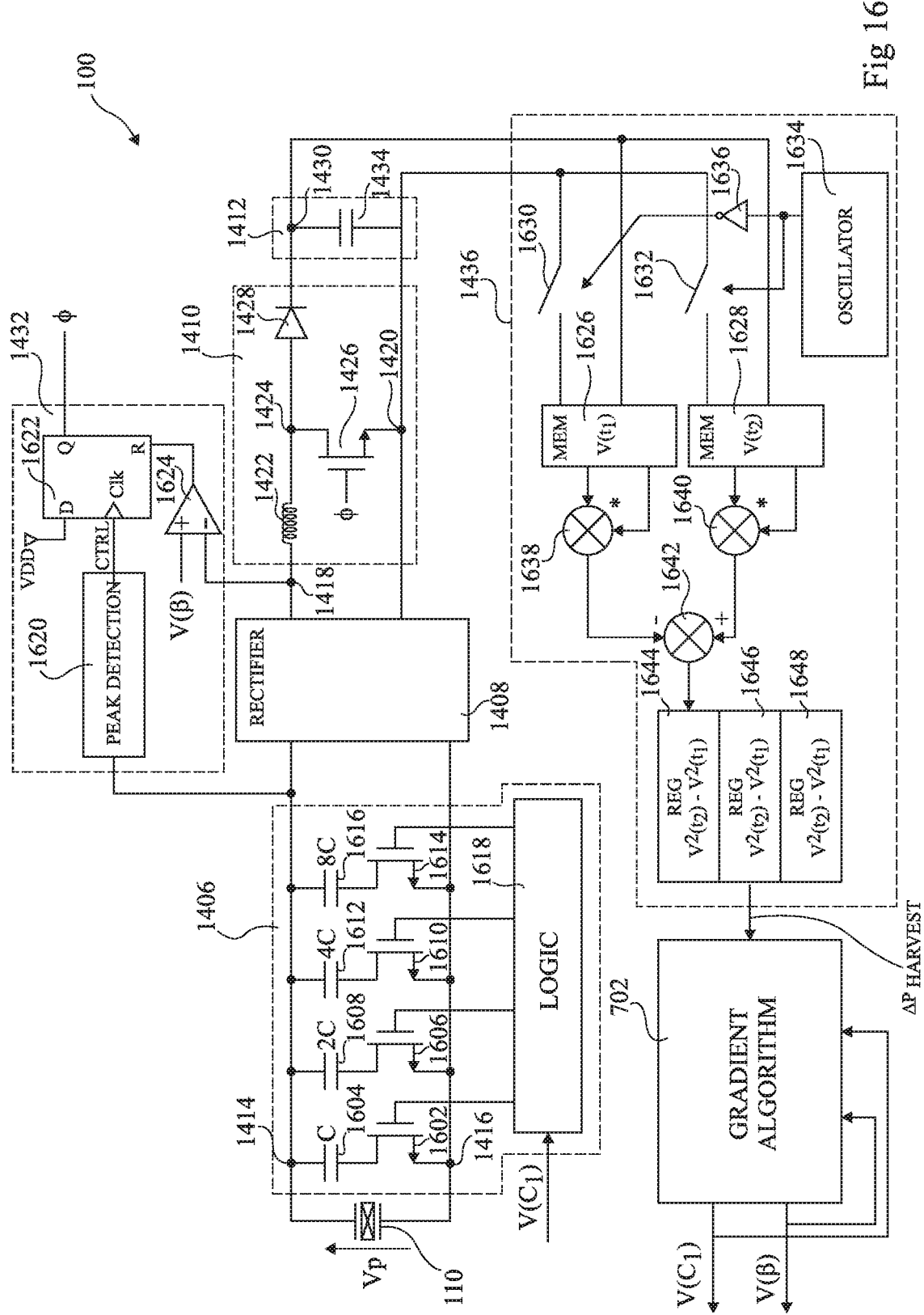
FIG. 16 schematically illustrates the energy harvester of FIG. 14 in more detail according to an example embodiment of the present disclosure.

FIG. 16 schematically illustrates the energy harvester 100 of FIG. 14 in yet further detail according to an example implementation.

The variable capacitor 1406 for example comprises: a transistor 1602, such as an NMOS transistor, coupled in series, with a capacitor 1604 between the terminals 1414 and 1416 of the piezoelectric layer 110, a transistor 1606, such as an NMOS transistor, coupled in series with a capacitor 1608 between the terminals 1414 and 1416 of the piezo-electric layer 110; a transistor 1610, such as an NMOS transistor, coupled in series with a capacitor 1612 between the terminals 1414 and 1416 of the piezoelectric layer 110; and a transistor 1614, such as an NMOS transistor, coupled in series with a capacitor 1616 between the terminals 1414 and 1416 of the piezoelectric layer 110. The capacitors 1604, 1608, 1612 and 1616 for example have respective capacitances of C, 2C, 4C and 8C. The transistors 1602, 1606, 1610 and 1614 are for example controlled by a logic circuit (LOGIC) 1618 receiving the parameter C1 in the form of a digital voltage signal V(C1).

The control circuit 1432 for example comprises a peak detection circuit (PEAK DETECTION) 1620 receiving the voltage $V_p$ at the node 1414 and providing an output control signal CTRL to the clock input of a flip-flop 1622. The data input of the flip-flop 1622 is for example tied to the supply voltage VDD, and the Q output signal provides the timing signal φ. The flip-flop 1622 is for example reset by the output of a comparator 1624 receiving at its positive input the parameter $\beta$ in the form of au analog voltage V($\beta$), and at its negative input the voltage at the output terminal 1418 of the rectifier 1408.

The power calculation circuit 1436 for example comprises memorization circuits (MEM) 1626 and 1628 each receiving the voltage at the output terminal 1430 of the energy storage circuit 1412, and each also receiving, via respective switches 1630 and 1632, the voltage at the output terminal 1420 of the energy storage circuit 1412. The switch 1630 is for example controlled by an output signal of an oscillator (OSCILLATOR) 1634 inverted by an inverter 1636, while the switch 1632 is for example controlled directly by the output signal of the oscillator 1634. The output signal of the oscillator for example has a frequency that is lower than the frequency of the vibrations, and for example in the range 1 to 10 Hz. In this way, the memorization circuits 1626, 1628 sample the voltage at the output of the energy storage circuit 1412 at two different time instances in order to generate two voltage readings $V(t_1)$ and $V(t_2)$ respectively. The memorization circuits 1626, 1628 also for example perform analog to digital conversion to provide digital samples of the voltage readings $V(t_1)$ and $V(t_2)$. Indeed, the subsequent operations (multiplication and subtraction) on the voltage readings are then for example performed in the digital domain. However, it would also be possible to store analog values of the voltages and perform the subsequent operations in the analog domain.

Squared values $V^2(t_1)$ and $V^2(t_2)$ of the voltage signals are for example generated by multipliers 1638 and 1640 respectively, and provided to a subtracter 1642, which generates a difference $V^2(t_2) - V^2(t_1)$, providing an indication of the recuperated energy between the times $t_1$ and $t_2$. This time lapse being constant, each of these readings thus provides an indication of the harvested power $P_{HARVEST}$. In the example of FIG. 16, three registers 1644, 1646 and 1648 are used to store the latest three power readings, and the registers are for example arranged to form a shift register such that values enter the register 1644, and output from the two registers 1646 and 1648. Indeed, the registers 1646 and 1648 for example store the readings $P_{HARVESTn}$ and $P_{HARVESTn-1}$ respectively, and the circuit 1436 for example outputs the power difference $\Delta P_{HARVEST}$ by subtracting $P_{HARVESTn-1}$ from $P_{HARVESTn}$ using a subtracter (not illustrated in FIG. 16).

In operation, the inductance 1422 is connected to the voltage across the piezoelectric layer 110 of the mechanical resonator 102 upon detection of the voltage peak, and the energy is transferred until the voltage falls to a level determined by the gradient algorithm 702.

Figure 17:
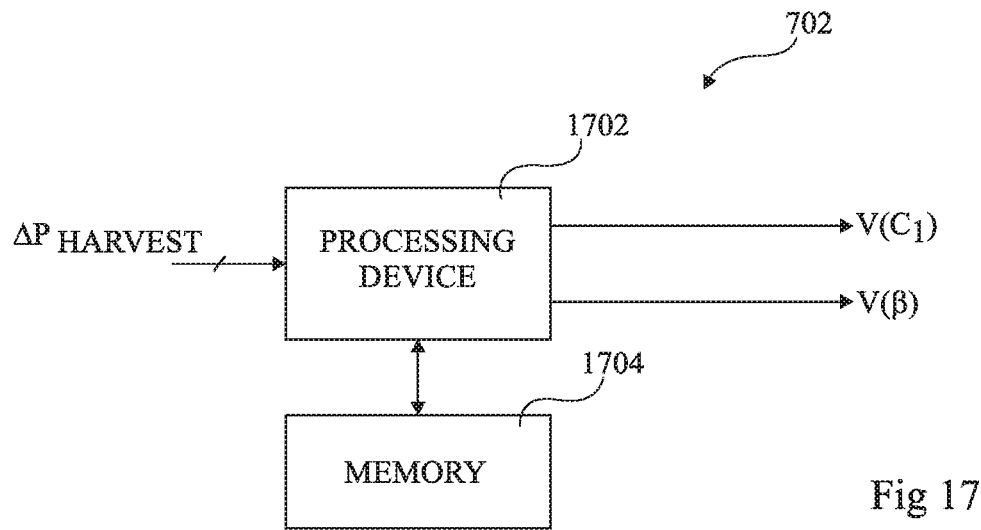
FIG. 17 schematically illustrates an example implementation of a gradient algorithm computation device of FIGS. 7, 14 and 16.

FIG. 17 schematically illustrates an example implementation of the gradient algorithm computation device 702 of FIGS. 7, 14 and 16 according to example embodiment. In this example, the device 702 is implemented by software executed by a processing device (PROCESSING DEVICE) 1702 comprising one or more processors under control of instructions stored in a memory (MEMORY) 1704. The processing device 1702 for example receives the power difference $\Delta P_{HARVEST}$ from the power calculation circuit 1436 in digital form, and generates the parameters $C_1$ and $\beta$ in the form of digital or analog voltage signals $V(C_1)$ and $V(\beta)$. For example, in some embodiments, the signal $V(C_1)$ is for example provided on a digital bus.

Figure 18:
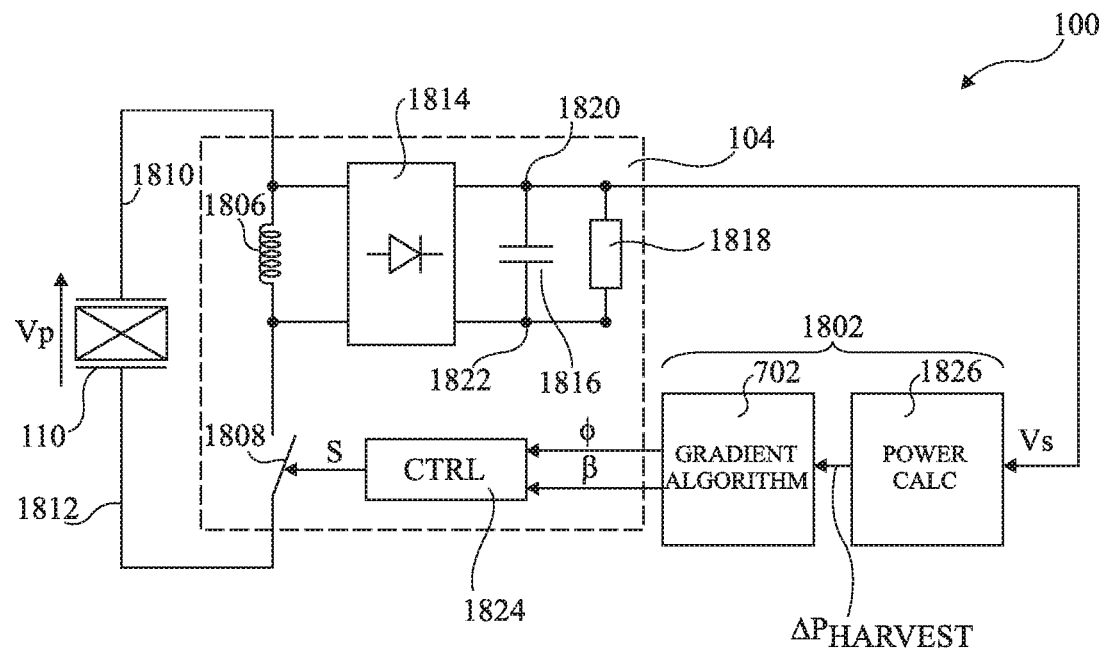
FIG. 18 schematically illustrates the energy harvester of FIG. 1 comprising a tuning circuit according to a further example embodiment of the present disclosure.

FIG. 18 schematically illustrates the vibrational energy harvester 100 of FIG. 1 in more detail according to yet a further example embodiment of the present disclosure.

The energy harvester 100 of FIG. 18 comprises the electric charge extraction circuit 104 and a tuning circuit 1802.

In this example, the electric charge extraction circuit 104 is based on one proposed in the publication by A. Badel et al. entitled "Wideband Piezoelectric Energy Harvester Tuned Through its Electric Interface Circuit", PowerMEMS 2014, Journal of Physics: Conference Series 557 (2014) 012115. The electric charge extraction circuit 104 for example comprises an inductor 1806 coupled in series with a switch 1808 between terminals 1810 and 1812 of the piezoelectric layer 110 of the mechanical resonator 102. The rectifier 1814 is coupled across the terminals of the inductor 1806, and an energy storage capacitor 1816 and a load 818 are coupled in parallel across the output terminals 1820 and 1822 of the rectifier 1814. A control circuit (CTRL) 1824 generates a timing signal S for controlling the switch 1808.

The tuning circuit 1802 for example comprises a power calculation circuit (POWER CALC) 1826, which is for example implemented in a similar fashion to the circuit 1436 of FIG. 16, and the gradient algorithm computation device (GRADIENT ALGORITHM) 702 described above. The gradient algorithm computation device 702 for example provides parameters $\phi$ and $\beta$ to the control circuit 1824.

Figure 19:
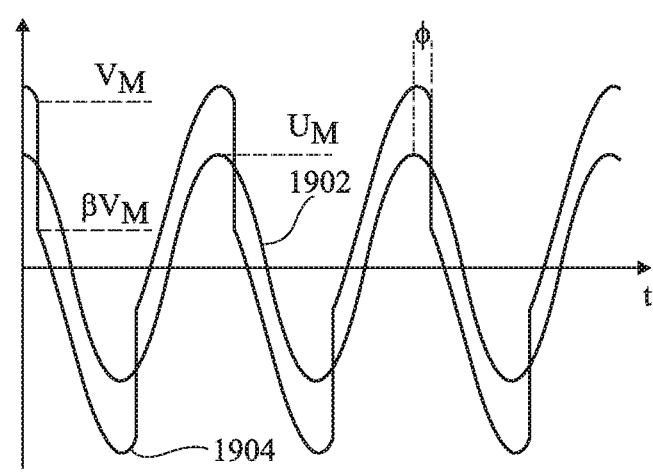
FIG. 19 is a timing diagram illustrating an example of signals in the energy harvester of FIG. 18.

FIG. 19 is a timing diagram illustrating an example of signals in the energy harvester 100 of FIG. 18. In particular, a curve 1902 represents the displacement of the mechanical resonator 102, having a peak displacement $U_M$, and a curve 1904 represents the voltage $V_p$ across the piezoelectric layer 110 of the mechanical resonator 102, which reaches a peak voltage higher than a level $V_M$ at which the switch 1808 is activated. There are two parameters of the signal S, which controls the switch 1808, that may be varied by the gradient algorithm 702 in order to vary the parameters $f_{res}$ and $\xi_e$ of the mechanical resonator. One of these parameters is the ON time $\beta$ of the switch 1808, in other words the time during which the switch 1808 is conducting, which determines the voltage level $\beta V_M$ reached by the voltage $V_p$ following activation of the switch 1808. The second parameter is the phase lag $\phi$ between the time of the peak voltage level of the voltage $V_p$ and the activation time of the switch 1808 when this voltage falls to the level $V_M$.

In the embodiment of FIGS. 18 and 19, the parameters $\psi_1$, $\psi_2$ for example correspond respectively to the parameters $\phi$ and $\beta$, and the parameters $f_{res}$ and $\xi_e$ are for example as follows:

$$f_{res} = f_0 \sqrt{\left(1 + k_m^2\left(1 + \frac{2(1-\beta)}{\pi(1+\beta)}\sin(\phi)\right)\right)} \quad \text{and:} \quad [\text{Eq. 14}]$$

$$\xi_e = k_m^2 \frac{2(1-\beta)}{\pi(1+\beta)}\cos^2(\phi) \quad [\text{Eq. 15}]$$

where $k^2m$ is the normalized electromagnetic coupling coefficient of the piezoelectric layer 110, and $f_0$ is the intrinsic resonance frequency of the mechanical resonator 102.

With reference to the flow diagram of FIG. 8, in the operation 801, the parameters $\phi$ and $\beta$ are each for example initialized to values $\phi_{init}=0$ and $\beta_{init}=0$ respectively, giving:

$$(\xi_{e_{init}}, f_{res_{init}}) = \left(\frac{2k_m^2}{\pi}, f_0\sqrt{1+k_m^2}\right) \quad [\text{Eq. 16}]$$

In the operations 802 and 803, the frequency $f_{res}$ is modified by modifying both parameters ($\phi,\beta$). By analysis of the equation for determining $f_{res}$, it can be seen that the parameter $\phi$ has more influence on the resonance frequency than the parameter $\beta$. Thus, in this example, the parameter $\phi$ is modified first and the function $h_{11}$ defined above is used in order to maintain the amount of electrically induced damping $\xi_e$ constant during the phase PHASE 1 using $\beta$.

The new value $\beta_{i+1}$ of the parameter $\beta$ as a function of the initial value $\xi_{ei}$ of the electrically induced damping can be determined as:

$$\beta_{i+1} = \frac{\left(1 - \frac{\xi_{e_i}\pi}{2k_m^2\cos^2(\phi_{i+1})}\right)}{\left(1 + \frac{\xi_{e_i}\pi}{2k_m^2\cos^2(\phi_{i+1})}\right)} \quad [\text{Eq. 17}]$$

Furthermore, we have the following equation for the initial value $\xi_{ei}$:

$$\xi_{e_i} = k_m^2 \frac{2(1-\beta_i)}{\pi(1+\beta_i)}\cos^2(\phi_i) \quad [\text{Eq. 18}]$$

Combining these equations gives the following equation for the new value $\beta_{i+1}$ of the parameter $\beta$ that provides a constant value of $\xi_{ei}$:

$$\beta_{i+1} = \frac{((1+\beta_i)\cos^2(\phi_{i+1}) - (1-\beta_i)\cos^2(\phi_i))}{((1+\beta_i)\cos^2(\phi_{i+1}) + (1-\beta_i)\cos^2(\phi_i))} = h_{11}(\phi_{i+1}) \quad [\text{Eq. 19}]$$

It is possible to verify this value by proving that $\xi_{ei+1}=\xi_{ei}$, and thus $k_1(\phi_{i+1},\beta_{i+1})$ is equal to $k_1(\phi_i,\beta_i)$, as follows. $k_1$ is defined such that:

$$k_1(\phi_i, \beta_i) = k_m^2 \frac{2(1-\beta_i)}{\pi(1+\beta_i)}\cos^2(\phi_i) \quad [\text{Eq. 20}]$$

From which:

$$k_1(\phi_{i+1}, \beta_{i+1}) = k_m^2 \frac{2(1-\beta_{i+1})}{\pi(1+\beta_{i+1})} \cos^2(\phi_{i+1}) \quad \text{[Eq. 21]}$$

Replacing $\beta_{i+1}$ by its expression in $k_1(\phi_{i+1},\beta_{i+1})$ gives:

$$k_1(\phi_{i+1}, \beta_{i+1}) = k_m^2 \frac{2(1-\beta_i)}{\pi(1+\beta_i)} \cos^2(\phi_i) = k_1(\phi_i, \beta_i) \quad \text{[Eq. 22]}$$

In the operation 804 of FIG. 8, the new parameters ($\phi_{i+1}$,$\beta_{i+1}$) are applied to the control circuit 1824 of the electric charge extraction circuit 1802, which modifies the signal S accordingly. The power calculation circuit 1826 then provides the power difference $\Delta P_{HARVEST}$ resulting from the new parameters. The operations 802, 803 and 804 are then repeated during the first phase PHASE 1 of the algorithm until the maximum power is reached in operation 805.

At the end of the first phase PHASE 1, the final resonance frequency $f_{res}$' has been found, and the amount of electrically induced damping $\xi_e$ resulting in maximum power is then for example determined during the second phase PHASE 2. In this example, both of the parameters ($\phi$,$\beta$) influence the resonance frequency and the amount of electrically induced damping, and thus both are modified during the second phase. Furthermore, in this example, the parameter $\beta$ has a greater influence on the damping than the parameter $\phi$, and thus the parameter $\beta$ is modified first. Based on the relationship between $f_{res}$, $\phi$ and $\beta$ defined above, the value of $\phi_{i+1}$ permitting to maintain $f_{res}$ constant is given by:

$$\phi_{i+1} = \arcsin\left(\frac{\pi}{2}\left(\frac{\left(\frac{f_{res_i}^2}{f_0^2}-1\right)}{k_m^2}-1\right)\frac{(1+\beta_{i+1})}{(1-\beta_{i+1})}\right) \quad \text{[Eq. 23]}$$

$$\text{with: } f_{res_i} = f_0\sqrt{\left(1+k_m^2\left(1+\frac{2(1-\beta_i)}{\pi(1+\beta_i)}\sin(\phi_i)\right)\right)} = f_{res}' \quad \text{[Eq. 24]}$$

Replacing $f_{res_i}$ in the expression for $\phi_{i+1}$, we obtain:

$$\beta_{i+1} = \arcsin\left(\frac{(1-\beta_i)(1+\beta_{i+1})}{(1+\beta_i)(1-\beta_{i+1})}\sin(\phi_i)\right) = h_{22}(\beta_{i+1}) \quad \text{[Eq. 25]}$$

The new parameters ($\phi_{i+1}$,$\beta_{i+1}$) are applied to the control circuit 1824 of the electric charge extraction circuit 1802, which modifies the signal S accordingly. The power calculation circuit 1826 provides the corresponding power differences, and when the maximum power MAX' is detected as described above, the algorithm for example ends.

An advantage of the embodiments described herein is that a relatively high level of harvested power, corresponding to a global rather than local peak, can be obtained for a broad variety of generators types. Indeed, by varying, during the phase PHASE 1, both of the parameter. $\psi_1$ and $\psi_2$ but ensuring that only the resonance frequency varies while the amount of electrically induced damping remains relatively constant, there is only a single maximum to be found. Similarly, by varying, during the phase PHASE 2, one or both of the parameters $\psi_1$ and $\psi_2$ but ensuring that only the amount of electrically induced damping varies while the resonance frequency remains relatively constant, there is again only a single maximum to be found.

Various embodiments and variants have been described. Those skilled in the art will understand that certain features of these embodiments can be combined and other variants will readily occur to those skilled in the art. For example, while FIGS. 3, 14, 16 and 18 provide particular examples of generators, it will be apparent to those skilled in the art that the principles herein could be applied to other types of generators based on piezoelectric energy extraction or other forms of energy extraction, such as electromagnetic energy extraction Furthermore, while embodiments are described in which maximums of extracted power are determined using a gradient algorithm, in alternative embodiments, other approaches could be used. For example, an algorithm based on dichotomy could be used in which, rather than searching for a maximum step by step, very high variations of the parameters could initially be applied, and the variations could become progressively smaller as the algorithm converges to the maximum level.

What is claimed is:

1. A method of tuning an electric charge extraction circuit of a vibrational energy harvester having a mechanical resonator, the method comprising:
   varying, during a first phase, first and second parameters of the electric charge extraction circuit based on detected harvested power, each of the first and second parameters influencing an amount of damping of the mechanical resonator and at least the first parameter influencing a resonance frequency of the mechanical resonator, wherein the first and second parameters are varied during the first phase such that the amount of damping remains constant or varies by less than a first significant amount and the resonance frequency varies and reaches a final resonance frequency level;
   varying, during a second phase, at least the second parameter based on the detected harvested power such that the resonance frequency remains at the final level, or varies with respect to the final resonance frequency level by less than a second significant amount, and the amount of damping reaches a final damping level.

2. The method of claim 1, wherein both the first and second parameters influence the resonance frequency, and both of the first and second parameters are varied during the second phase.

3. The method of claim 1, wherein varying the first and second parameters during the first phase is based on a feedback signal indicating the harvested power.

4. The method of claim 1, wherein the first parameter may only have one of N discrete levels, and the second parameter may only have one of M discrete levels, N and M being integers each equal to at least four.

5. The method of claim 4, wherein the final resonance frequency level corresponds to a level resulting in a highest amount of harvested power among all combinations of the levels of the first and second parameters during the first phase while the amount of damping varies by less than the first significant amount.

6. The method of claim 1, wherein the first parameter may only have one of N discrete levels, and the second parameter may only have one of M discrete levels, N and M being integers each equal to at least four, and wherein the final damping level corresponds to a level resulting in a highest amount of harvested power among all combinations of levels of the first and second parameters during the second phase while the resonance frequency varies by less than the second significant amount with respect to its final resonance frequency level.

7. The method of claim 4, wherein the first significant amount corresponds to the smallest variation in view of the discrete levels of the first and second parameters.

8. The method of claim 1, wherein the first parameter may only have one of N discrete levels, and the second parameter may only have one of M discrete levels, N and M being integers each equal to at least four, and wherein the second significant amount corresponds to the smallest variation in view of the discrete levels of the first and second parameters.

9. The method of claim 1, wherein the vibrational energy harvester comprises a mechanical resonator having a piezoelectric layer.

10. A tuning circuit for tuning an electric charge extraction circuit of a vibrational energy harvester having a mechanical resonator, the tuning circuit being configured to:

vary, during a first phase, first and second parameters of the electric charge extraction circuit based on detected harvested power, each of the first and second parameters influencing an amount of damping of the mechanical resonator and at least the first parameter influencing a resonance frequency of the mechanical resonator, wherein the tuning circuit is configured to vary the first and second parameters during the first phase such that the amount of damping remains constant or varies by less than a first significant amount and the resonance frequency varies and reaches a final level; and vary, during a second phase, at least the second parameter based on the detected harvested power such that the resonance frequency remains constant or varies with respect to the final level by less than a second significant amount and the amount of damping reaches a final level.

* * * * *